Nov. 3, 1936.  F. W. MERRILL  2,059,886

DYNAMO-ELECTRIC MACHINE

Filed Feb. 14, 1936

Inventor:
Frank W. Merrill,
by Harry E. Dunham
His Attorney.

Patented Nov. 3, 1936

2,059,886

UNITED STATES PATENT OFFICE 2,059,886

DYNAMO-ELECTRIC MACHINE

Frank W. Merrill, Fort Wayne, Ind., assignor to General Electric Company, a corporation of New York Application February 14, 1936, Serial No. 63,870

8 Claims. (Cl. 171—209)

My invention relates to improvements in dynamo-electric machines and particularly to the type of machine having a permanent magnet excitation system.

Permanent magnets have heretofore been used for the excitation of small dynamo-electric machines, but the size of these machines has generally been relatively large compared to an electrically excited machine of the same rating. Such magnets have usually been of the horseshoe shape to obtain the length and shielding against demagnetization necessary for satisfactory performance and, because of the size and shape of these magnets, they have usually been placed on the stator of the machine. Recent improvements in permanent magnet materials of high magnetic retentivity, such as may be formed of an iron-nickel-aluminum alloy, as described in United States Patent 1,947,274, February 13, 1934, Ruder, or an iron-nickel-aluminum-cobalt alloy, as described in United States Patent 1,968,569, July 13, 1934, Ruder, make possible the use of pads or short bar-shaped permanent magnets which retain their magnetism indefinitely.

An object of my invention is to provide a dynamo-electric machine having an excitation system of substantially greater length axially of the machine than the magnetic core with which the excitation system cooperates electro-dynamically and an arrangement for concentrating the flux produced by this excitation system into the air gap between the magnetic core and the excitation system and for minimizing flux leakage at the ends of the excitation system beyond the air gap.

Further objects and advantages of my invention will become apparent, and my invention will be better understood, from the following description referring to the accompanying drawing, and the features of novelty which characterize my invention will be pointed out with particularity in the claims appended to and forming a part of this specification.

Figure 1:
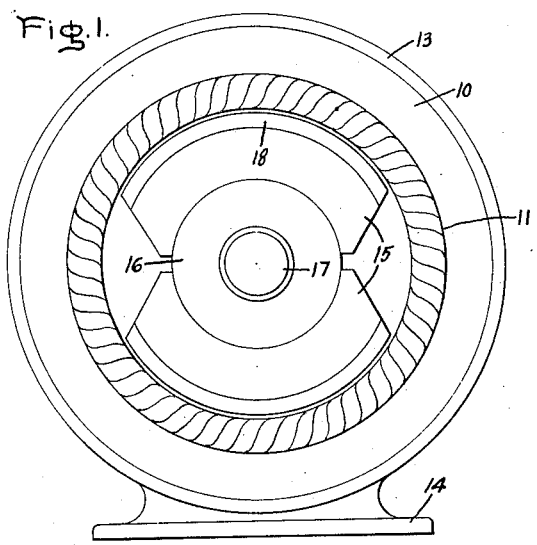
Figure 2:
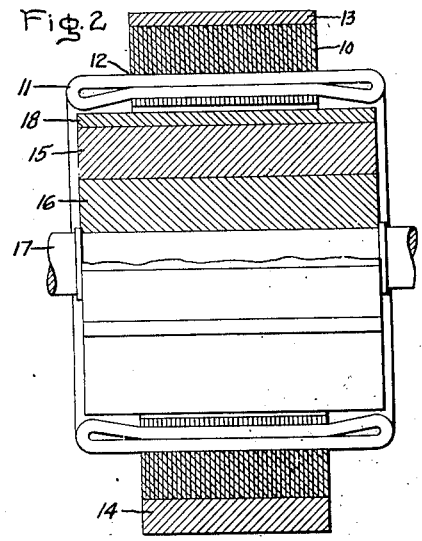
Figure 3:
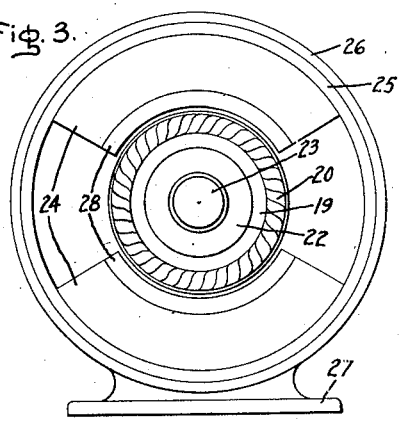
Figure 4:
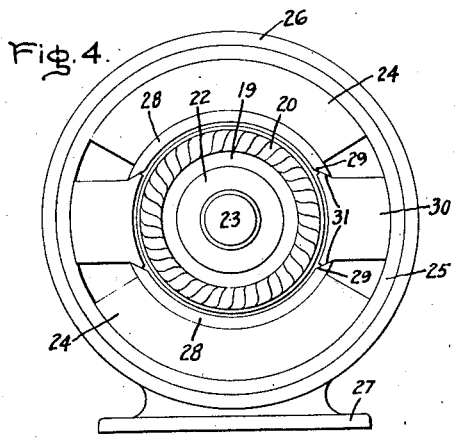

In the drawing, Fig. 1 is an end view of a dynamo-electric machine having a rotor provided with an embodiment of my improved excitation system; Fig. 2 is a partial sectional side elevation of the machine illustrated in Fig. 1; Fig. 3 is an end view of a dynamo-electric machine having a stator provided with an embodiment of my improved excitation system; Fig. 4 is an end view of a dynamo-electric machine having a stator provided with another embodiment of my improved excitation system, and Fig. 5 is a partial sectional side elevation of the machine illustrated in Figs. 3 and 4.

Referring to the drawing, in Figs. 1 and 2, I have illustrated a dynamo-electric machine including a stationary member provided with a laminated core 10 of magnetic material having a winding 11 arranged in slots 12 formed in the magnetic core 10. The stationary core 10 is secured within a frame 13 which is provided with a base 14 for supporting the dynamo-electric machine. The field excitation system of this dynamo-electric machine comprises a rotatable member which is arranged to cooperate electro-dynamically with the stationary core 10 and the winding 11. This rotatable member includes two circumferentially extending thin bar-type permanent magnet pads or pole pieces 15 mounted upon a cylindrical soft iron or soft steel core 16 secured to a shaft 17. The inner surfaces of these pole pieces extend over almost the entire circumference of the core 16, but the outer surface of each pole piece has a pole arc only slightly greater than 120 electrical degrees. These pole pieces are preferably formed of an alloy of aluminum, nickel, cobalt, and iron, referred to above. The greatest magnetic energy output from a given weight of permanent magnet material is obtained when the flux density of this alloy is about 12,000 maxwells per sq. in. In the magnetic circuit of an ordinary direct current motor, the flux density in the air gap usually varies between 40,000 and 60,000 maxwells per sq. in. Thus, in a dynamo-electric machine provided with permanent magnet pole pieces having a flux density of 12,000 maxwells per sq. in., or less, provision must be made for developing a higher air gap flux density than the flux density within the exciting pole pieces. In order to obtain the desired air gap density, I construct the pole pieces 15 of a substantially greater axial length than the length of the stationary magnetic core 10 and provide soft iron or soft steel pole faces 18 which act as flux concentrators. These pole faces of soft magnetic material are carried on the outer surfaces of the pole pieces and provide a path of low magnetic reluctance for the flux produced by the portion of the pole pieces extending beyond the air gap between the pole pieces and the magnetic core 10, in completing the magnetic circuit through the stationary core 10, thereby minimizing flux leakage at the ends of the pole pieces 15. As shown in Figs. 1 and 2, the pole faces 18 have substantially the same axial length and substantially the same pole face surface area as the pole pieces 15. In this manner, flux densities may be obtained in the air gap which compare favorably with the air gap densities in the ordinary type of direct current excited dynamo-electric machine.

Figure 5:
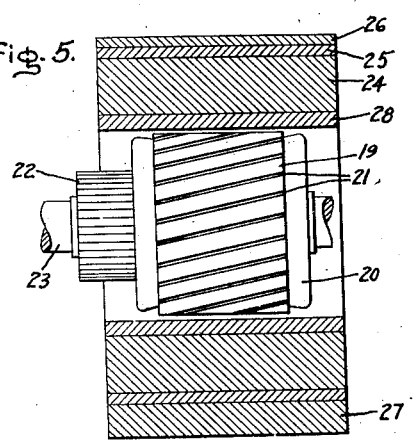

In the embodiments of my invention illustrated in Figs. 3, 4, and 5 the dnamo-electric machines include a rotatable member provided with a laminated core 19 of magnetic material having a winding 20 arranged in slots 21 of the core 19 and connected to a commutator 22. This rotatable member is essentially the usual type direct current armature and is mounted upon a shaft 23.

The excitation system of the dynamo-electric machine shown in Fig. 3 comprises a stationary member arranged to cooperate electrodynamically with the rotatable core 19, and includes two circumferentially extending thin bar-type permanent magnet pads or pole pieces 24 which are welded, bolted, or otherwise secured, to a soft iron or soft steel frame 25. The frame 25 is mounted in another frame or cylindrical shell 26 which is provided with a base 27 for supporting the dynamo-electric machine. As in the embodiment illustrated in Figs. 1 and 2, the pole pieces 24 are preferably formed of an alloy of aluminum, nickel, cobalt, and iron. In order to obtain the desired air gap flux density, these pole pieces 24 and the frame 25 are constructed of a substantially greater axial length than the length of the rotatable core 19 and are provided with soft iron or soft steel pole faces 28 which act as flux concentrators or collectors. These pole faces of soft magnetic material and substantially the same axial length and pole face surface area as the pole pieces 24 provide a path of low magnetic reluctance for concentrating or collecting the flux produced by the portion of the pole pieces extending beyond the air gap between the pole pieces and the magnetic core 19 and minimize flux leakage at the ends of these pole pieces.

In Fig. 4 I have illustrated a dynamo-electric machine which includes a rotatable member of the same construction as that illustrated in Fig. 3, and is provided with an excitation system comprising a stationary member arranged to cooperate electrodynamically with the rotatable core 19. This stationary member includes a pair of circumferentially extending thin bar-type permanent magnet pads or pole pieces 24 which are preferably formed of an alloy of aluminum, nickel, cobalt, and iron, referred to above, and have a substantially greater axial length than the rotatable core 19. Pole faces 28, of a soft magnetic material, having substantially the same length and same pole face surface area as the permanent magnet pads are secured thereto, and act as flux concentrators or collectors for the ends of the pole pieces extending beyond the air gap. These pole faces are formed with beveled edges 29 and the pole pieces are spaced apart and secured to a stationary frame 25 of magnetic material by a pair of non-magnetic interpolar members 30 provided with beveled flanges 31 arranged to cooperate with the beveled edges 29 of the pole faces 28. These interpolar members 30 are bolted, or otherwise secured, to the frame 25 and to a frame 26 formed with a base 27 for supporting the dynamo-electric machine. In this construction the pole pieces 24, the frame 25, and the interpolar securing members 30 can all be manufactured separately of one another and provide a simple arrangement which can be readily assembled and disassembled. This construction also insures against possible slight demagnetization of the permanent magnet pads 24 during assembly, such as might occur if these magnets are welded, or otherwise heated, when they are secured to the frame 25.

Modifications of the various embodiments of my invention, which I have illustrated and described, will occur to those skilled in the art. I desire it to be understood, therefore, that my invention is not to be limited to the particular arrangements disclosed, and I intend, in the appended claims, to cover all modifications which do not depart from the spirit and scope of my invention.

What I claim as new and desire to secure by Letters Patent of the United States is:

1. A dynamo-electric machine having a core of magnetic material provided with a winding, a magnetic excitation system including a plurality of permanent magnet pole pieces of substantially greater axial length than said core arranged to cooperate electrodynamically therewith, and means for concentrating the flux produced by said excitation system in the air gap between said core and said pole pieces and for minimizing flux leakage beyond the air gap.

2. A dynamo-electric machine having a core of magnetic material provided with a winding, a magnetic excitation system including a plurality of permanent magnet pole pieces of substantially greater axial length than said core arranged to cooperate electrodynamically therewith, and means including pole faces of soft magnetic material carried by said pole pieces and having substantially the same axial length as said pole pieces for concentrating the flux produced by said excitation system in the air gap between said core and said pole pieces and for minimizing flux leakage beyond the air gap.

3. A dynamo-electrical machine having a core of magnetic material provided with a winding, a magnetic excitation system arranged to cooperate electrodynamically with said core including circumferentially extending thin permanent magnet pole pieces of substantially greater axial length than said core, and pole faces of soft magnetic material carried by said pole pieces and having substantially the same axial length as said pole pieces.

4. A dynamo-electric machine having a core of magnetic material provided with a winding, a magnetic excitation system arranged to cooperate electrodynamically with said core including a second core of magnetic material of substantially greater axial length than said first mentioned core, permanent magnet pole pieces secured to said second core, and pole faces of soft magnetic material carried by said pole pieces, said pole pieces and pole faces having substantially the same axial length as said second core.

5. A dynamo-electric machine having a core of magnetic material provided with a winding, a magnetic excitation system arranged to cooperate electrodynamically with said core including circumferentially extending thin permanent magnet pole pieces of an alloy of high magnetic retentivity, each of said pole pieces having an axial length substantially greater than said core, and pole faces of soft magnetic material carried by said pole pieces and having substantially the same axial length as said pole pieces.

6. An excitation system for a dynamo-electric machine including a core of magnetic material, circumferentially extending thin permanent magnet pole pieces secured to said core, and pole faces of soft magnetic material carried by said pole pieces, said pole faces having substantially the same axial length as said pole pieces and having substantially the same pole face surface area as said pole pieces.

7. An excitation system for a dynamo-electric machine including a frame of magnetic material, permanent magnet pole pieces, pole faces of soft magnetic material carried by said pole pieces and having substantially the same axial length as said pole pieces, and means including a member of non-magnetic material secured to said frame for spacing apart and for securing said pole pieces to said frame.

8. A dynamo-electric machine having a core of magnetic material provided with a winding, a magnetic excitation system arranged to cooperate electrodynamically with said core including a second core of magnetic material of substantially greater axial length than said first mentioned core member, permanent magnet pole pieces secured to said second core, pole faces of soft magnetic material secured to said permanent magnet pole pieces, said pole pieces and said pole faces having substantially the same length as said second core, and means including a member of non-magnetic material secured to said second magnetic core for spacing apart and for securing said pole pieces to said second magnetic core.

FRANK W. MERRILL.